US006659578B2

(12) United States Patent
Gudaitis et al.

(10) Patent No.: US 6,659,578 B2
(45) Date of Patent: Dec. 9, 2003

(54) TUNING SYSTEM FOR A COMPACT OPTICAL SENSOR

(75) Inventors: Algird M. Gudaitis, Vancouver, WA (US); Sam Sarmast, Vancouver, WA (US); Tod S. Heiles, Vancouver, WA (US); Dan Arquilevich, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/969,745

(22) Filed: Oct. 2, 2001

(65) Prior Publication Data

US 2003/0189618 A1 Oct. 9, 2003

(51) Int. Cl.[7] ........................ B41J 29/393; H04N 1/034

(52) U.S. Cl. ............................................. 347/3; 347/19

(58) Field of Search ................................ 347/43, 3, 19; 235/470; 356/406

(56) References Cited

U.S. PATENT DOCUMENTS 5,229,841 A * 7/1993 Taranowski et al. ........ 356/406
5,883,646 A 3/1999 Beauchamp
6,322,192 B1 11/2001 Walker ........................ 347/19
6,449,041 B1 * 9/2002 Jung et al. .................. 356/326

FOREIGN PATENT DOCUMENTS

EP 0864931 9/1998
GB 2351558 1/2001
JP 2000355443 12/2000
WO WO 98/11410 3/1998

OTHER PUBLICATIONS

Michael J. Vrhel, "An LED based spectrophotometric instrument", Jan. 1999, pp. 226–236.

Color Savvy Systems Limited, "Making Consistent Color Affordable" advertisement.

British Search Report dated Nov. 26, 2002.

* cited by examiner

*Primary Examiner*—Thinh Nguyen

(57) ABSTRACT

A compact optical sensing system is used in hardcopy devices for scanning and/or printing images, for instance, using inkjet printing technology in desktop printing or in photographic printers appearing in grocery and variety stores. Several light emitting diodes ("LEDs") illuminate a sheet of print media, and one or more photodiodes receive light reflected from the sheet. The photodiode generates signals in response to the light received, and the hardcopy device uses these signals to adjust printing parameters for optimal print quality. Using a chip-on-board process, the bare silicon die for each component is wire bonded directly to a printed circuit board assembly, allowing at least four LEDs (blue, green, red and soft-orange) to be grouped closely together in a space smaller than that occupied by a factory-made, single-packaged LED. A calibrating system uses a white target covered for cleanliness by a windowed door which is opened/closed by a printhead carriage.

42 Claims, 9 Drawing Sheets

TUNING SYSTEM FOR A COMPACT OPTICAL SENSOR

INTRODUCTION

The present invention relates generally to optical sensing systems, such as those which are used in hardcopy devices for scanning and/or printing images on print media, for example, using inkjet printing technology.

Inkjet printing mechanisms use pens which shoot drops of liquid colorant, referred to generally herein as "ink," onto a page. Each pen has a printhead formed with very small nozzles through which the ink drops are fired. To print an image, the printhead is propelled back and forth across the page, shooting drops of ink in a desired pattern as it moves. The particular ink ejection mechanism within the printhead may take on a variety of different forms known to those skilled in the art, such as those using piezo-electric or thermal printhead technology. For instance, two earlier thermal ink ejection mechanisms are described and shown in U.S. Pat. Nos. 5,278,584 and 4,683,481, both assigned to the present assignee, the Hewlett-Packard Company of Palo Alto, Calif. In a thermal system, a barrier layer containing ink channels and vaporization chambers is located between a nozzle orifice plate and a substrate layer. This substrate layer typically contains linear arrays of heater elements, such as resistors, which are energized to heat ink within the vaporization chambers. Upon heating, an ink droplet is ejected from a nozzle associated with the energized resistor. By selectively energizing the resistors as the printhead moves across the page, the ink is expelled in a pattern on the print media to form a desired image (e.g., picture, chart or text).

To clean and protect the printhead, typically a "service station" mechanism is mounted within the printer chassis so the printhead can be moved over the station for maintenance. For storage, or during non-printing periods, the service stations usually include a capping system which hermetically seals the printhead nozzles from contaminants and drying. To facilitate priming, some printers have priming caps that are connected to a pumping unit to draw a vacuum on the printhead. During operation, partial occlusions or clogs in the printhead are periodically cleared by firing a number of drops of ink through each of the nozzles in a clearing or purging process known as "spitting." The waste ink is collected at a spitting reservoir portion of the service station, known as a "spittoon." After spitting, uncapping, or occasionally during printing, most service stations have a flexible wiper, or a more rigid spring-loaded wiper, that wipes the printhead surface to remove ink residue, as well as any paper dust or other debris that has collected on the printhead.

Optical sensors have been incorporated into various inkjet printing mechanisms, such as printers and plotters, for the past several years. These optical sensors illuminated the media using one to twelve light emitting diodes ("LEDs"). In U.S. Pat. No. 6,036,298, currently assigned to the present assignee, the Hewlett-Packard Company, a single monochromatic, or "quasimonochromatic" LED was proposed using a blue LED. This patent also has a detailed description of several prior art optical sensors, including those using the red and green LEDs. A single LED optical sensor emitting a blue-violet light was first introduced in the DeskJet® 990C model color inkjet printer last year. The single blue-violet LED illuminated the media, while two sensors received light reflected from the media, with one receiving diffuse light beams, and the other receiving specular light beams. Incoming light was restricted by two different stops, two rectangular windows having longitudinal axes which were perpendicular to one another. From information gathered by the sensor, the printer controller determined which type of media was entering the printzone and then adjusted the printing routines to provide an optimal image on the particular media used.

Unfortunately, all of these earlier optical sensors employed in inkjet printing mechanisms used bulky, commercial LEDs, which caused the sensors to occupy a large amount of space within the printing mechanism. It is believed that earlier this year, plotter designers for the Hewlett-Packard Company introduced a three LED optical sensor, using LEDs of the colors blue, green, and amber in the Designet® 10 ps, 20 ps and 50 ps models of color inkjet plotters. While the amount of space consumed by a sensor in a large floor mounted plotter has little impact on the overall desirability of the unit, in the desktop printing market, many consumers prefer a compact printing unit which occupies very little desk space, known in the art as having a small "footprint." Thus, in the desktop printer market, use of a wide bulky sensor mounted on the printhead scanning carriage increased the overall width of the printer by up to an inch (2.54 cm). While plotter designers were able to use optical sensors having multiple LEDs without impacting the overall plotter design, designers of desktop printers strived to find ways to use a single LED, for instance as described above in U.S. Pat. No. 6,036,298 and as sold in the DeskJet® 990C model color inkjet printer, mentioned above. Use of two or more LEDs in the desktop printer market was unthinkable, due to the adverse impact such a multiple LED sensor would have on a printer's footprint, theoretically making a printer up to two inches (5.08 cm) wider. Such an additional width in a desktop printer could well make consumers turn away from the printer, and buy a more compact printer produced by a competitor, even at the expense of sacrificing the print quality benefits achieved by printers employing an optical sensor system. Furthermore, while these earlier optical sensor systems may have had some calibration at the factory, none are known to have had any way of automatically calibrating the sensors after the printing units left the factory.

One hand held color scanner has been developed by Color Savvy, of Springboro, Ohio, as described in the paper entitled "An LED Based Spectrophotometric Instrument, " by Michael J. Vrhel, published as a part of the IS&T/SPIE Conference on Color Imaging: Device-Independent Color, Color Hardcopy , and Graphic Arts IV, San Jose, Calif., January 1999 (SPIE Vol. 3648, No. 0277-786X/98), as well as the system described in Color Savvy's International Patent Application No. PCT/US97/16009, published Mar. 19, 1998, International Application No. WO 98/11410. Indeed, Color Savvy even advertises a scanning adapter that may be attached to the printhead scanning carriage of some inkjet printers, allowing the system to scan previously printed images. These devices made by Color Savvy are designed to "see" an infinite variety of different colors, shades and hues, and to accomplish this objective in a satisfactory manner, Color Savvy needs eight to sixteen different colored LEDs to illuminate the image. As mentioned above, such a bulky sensor having multiple LEDs will be too cumbersome for use in typical inkjet printers. Note that the Color Savvy adapter, when placed in an inkjet printer, rendered the unit unusable for printing.

DRAWING FIGURES

DETAILED DESCRIPTION

Figure 1:
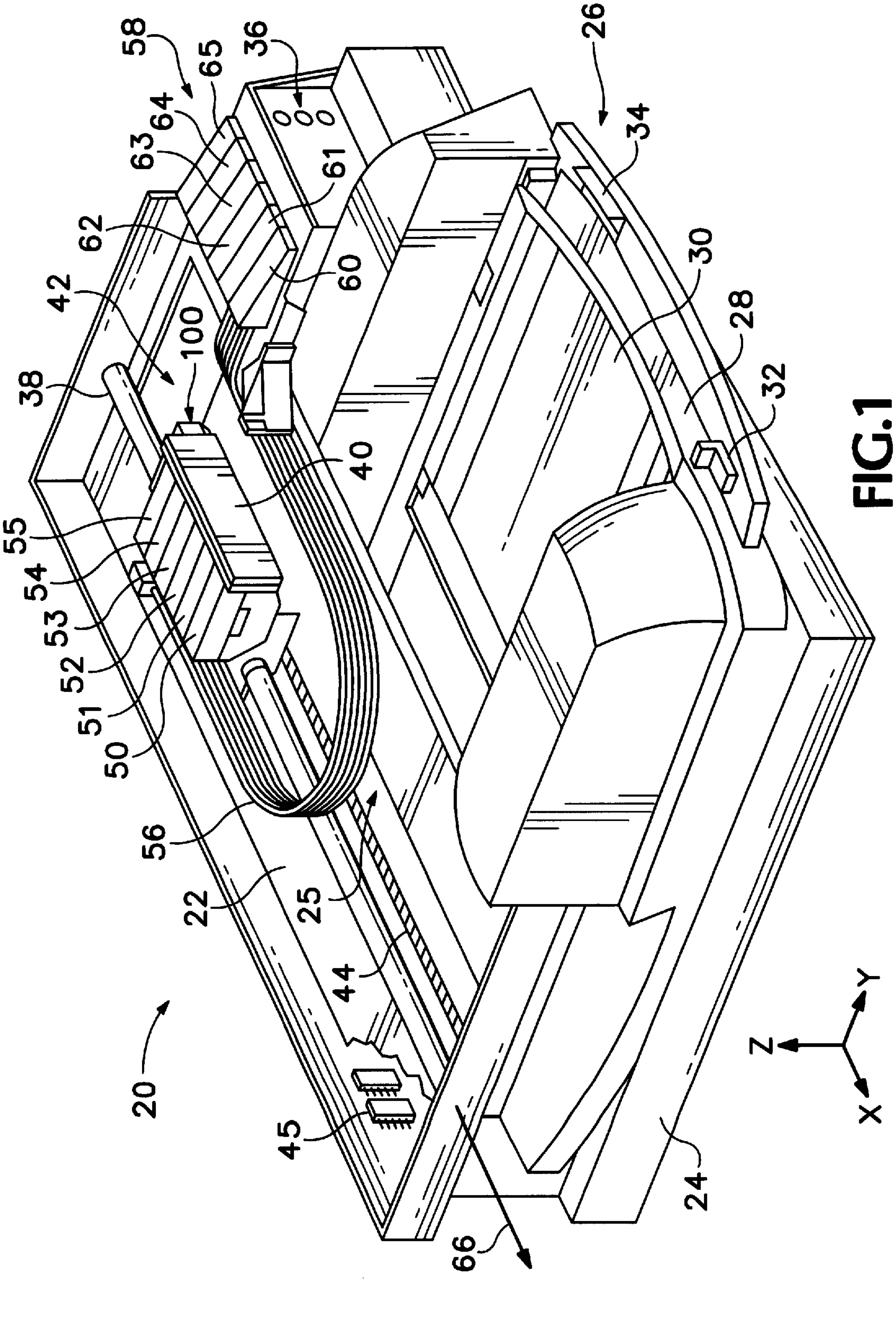
FIG. 1 is a perspective view of one form of a hardcopy device, here shown as an ink printing mechanism, and in particular, a desktop inkjet printer incorporating one form of a compact optical sensing system of the present invention.

FIG. 1 illustrates an embodiment of a hardcopy device 20 having a reciprocating head, which may be constructed in accordance with the present invention such as a scanner, an inkjet printing mechanism, or multi-function hardcopy device having both scanning and printing capabilities. Initially, for the purposes of illustration, the hardcopy device 20 is described as an inkjet printing mechanism, here shown as an "off-axis" inkjet printer 20, constructed in accordance with the present invention, which may be used for printing business reports, correspondence, desktop publishing, and the like, in an industrial, office, home or other environment. A variety of inkjet printing mechanisms are commercially available. For instance, some of the printing mechanisms that may embody the present invention include plotters, portable printing units, copiers, cameras, video printers, and facsimile machines, to name a few, as well as various combination devices, such as a combination facsimile/printer which has both scanning and printing capabilities. For convenience the concepts of the present invention are illustrated first in the environment of an inkjet printer 20.

While it is apparent that the printer components may vary from model to model, one typical inkjet printer 20 includes a chassis 22 surrounded by a housing or casing enclosure 24, the majority of which has been omitted for clarity and viewing the internal components. Sheets of print media are fed through a printzone 25 by a print media handling system 26. The print media may be any type of suitable sheet material, such as paper, card stock, envelopes, fabric, transparencies, mylar, and the like, but for convenience, the illustrated embodiment is described using plain paper as the print medium. The print media handling system 26 has a media input, such as a supply or feed tray 28 into which a supply of media is loaded and stored before printing. A series of conventional media advance or drive rollers (not shown) powered by a conventional motor and gear assembly (not shown) may be used to move the print media from the supply tray 28 into the printzone 25 for printing, and then into the output tray 30 for drying. Some inkjet printers employ a series of retractable and/or extendable wings (not shown) upon which a freshly printed sheet momentarily dries before being dropped into the output tray, to prevent smearing of a previously printed sheet lying below in the output tray 30. The media handling system 26 may include a series of adjustment mechanisms for accommodating different sizes of print media, including letter, legal, A4, envelopes, photo media, and the like. To secure the generally rectangular media sheets in the input tray, a sliding width adjustment lever 32 and a sliding length adjustment lever 34 may be used.

The printer 20 may receive inputs from a variety of different mechanisms, such as through a keypad 36. In the illustrated embodiment, the chassis 22 supports a guide rod 38 which in turn, slidably supports a printhead carriage 40. The carriage 40 moves back and forth reciprocally over a printzone 25, and into a servicing region 42. The carriage 40 may be driven by a conventional carriage propulsion system, such as via an endless belt and drive motor (not shown). The carriage propulsion system also has a positional feedback system, such as a conventional optical encoder system including an encoder strip 44 and an encoder strip reader (not shown) mounted on the carriage 40. Signals regarding the carriage position are then fed to a controller portion 45 of the printer. The controller 45 also controls media movement through the printzone, ink ejection for printing, and various servicing routines. The various electrical conductors and wiring for coupling the controller to these different subsystems of printer 20 have been omitted for clarity. As used herein the printer controller 45 is illustrated schematically as a microprocessor, that receives instructions from a host device, typically a computer, such as a personal computer (not shown) indeed, many of the printer controller functions may be performed by the host computer, by electronics on board the printer, or by interactions therebetween. As used herein, "printer controller 45" encompasses these functions, whether performed by the host computer, the printer, an intermediary device therebetween, or by a combined interaction of such elements. A monitor coupled to the host computer may be used to display visual information to an operator, such as the printer status or a particular program being run on the host computer. Personal computers, their input devices, such as keyboard and/or a mouse device, touch pads, and monitors are all well known to those skilled in the art.

In the printzone 25 the media receives ink from an inkjet cartridge, or here in the illustrated embodiment from six inkjet cartridges 50, 51, 52, 53, 54 and 55 carrying (1) light cyan, (2) cyan, (3) black, (4) magenta, (5) light magenta and (6) yellow colors of ink, respectively. The illustrated inkjet printer 20 is known as an "off-axis" inkjet printer, because the carriage mounted cartridges 50–55 carry only a small supply of ink, which is replenished through a series of flexible ink tubes 56 from a stationary main reservoir portion 58 of the printer. In the illustrated embodiment, the main reservoir portion 58 houses six separate ink reservoirs 60, 61, 62, 63, 64, and 65 which supply ink to the respective inkjet cartridges 50, 51, 52, 53, 54, and 55. In contrast to the off-axis ink delivery system shown in FIG. 1, a suitable substitution may be an inkjet printer having replaceable cartridges, which carry the entire ink supply within the carriage 40 as it reciprocates over the printzone 25. Hence, a replaceable cartridge system may be considered as an "on-axis" system because the entire ink supply is carried along a scanning axis 66, which is defined by the guide rod 38. While one form of an on-axis system carries replaceable cartridges where both the ink ejecting printhead and the ink reservoir are supplied as a unit and replaced when the cartridge is empty, another on-axis system is known in the industry as a "snapper." In a snapper system, the printheads are permanently or semi-permanently mounted to the printhead carriage, and the ink supply is a separate unit which is snapped onto the printhead.

A variety of different types of inkjet printheads may be employed, such as thermal printheads, piezo-electric printheads, and silicon electrostatic actuator ("SEA") printheads, as well as other types of printhead technology known to those skilled in the art. One example of SEA inkjet technology is disclosed in U.S. Pat. No. 5,739,831 to Nakamura (assigned to the Seiko Epson Corporation). The illustrated embodiment presumes that thermal inkjet printheads are used where a firing resistor is associated with each one of the ink ejecting nozzles. Upon energizing a selected resistor, a bubble of gas is formed which ejects a droplet of ink from the nozzle and onto a sheet of paper in the printzone 25 under the nozzle. The printhead resistors are selectively energized in response to firing command control signals received by the carriage 40 from the controller 45, with the carriage 40 delivering these firing signals to the printheads of each of the cartridges 50–55.

Compact Optical Sensing System

Figure 2:
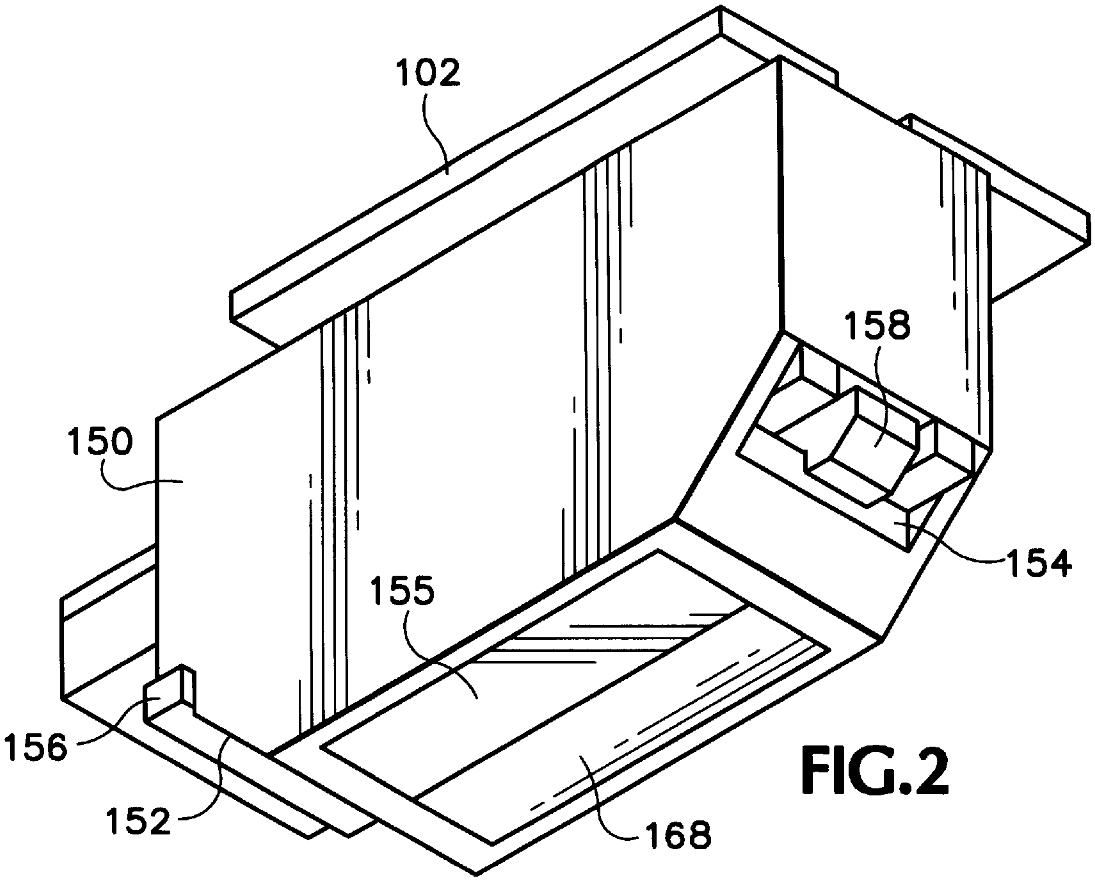
FIG. 2 is a bottom perspective view of one form of a compact optical sensor used in the sensing system of FIG. 1.
Figure 3:
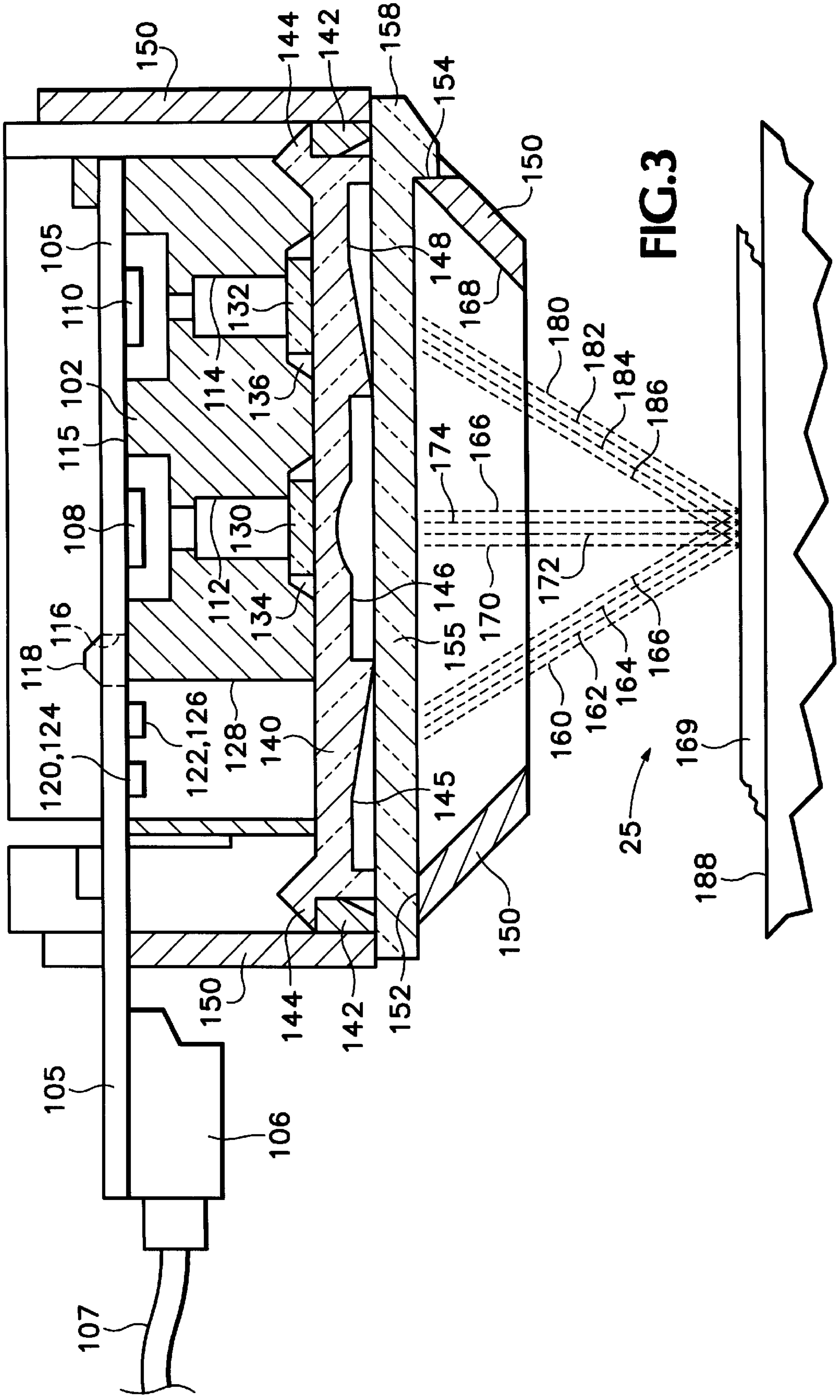
FIG. 3 is a side elevational sectional view of the compact optical sensor of FIG. 2, shown monitoring a portion of a sheet of print media, such as paper.
Figure 4:
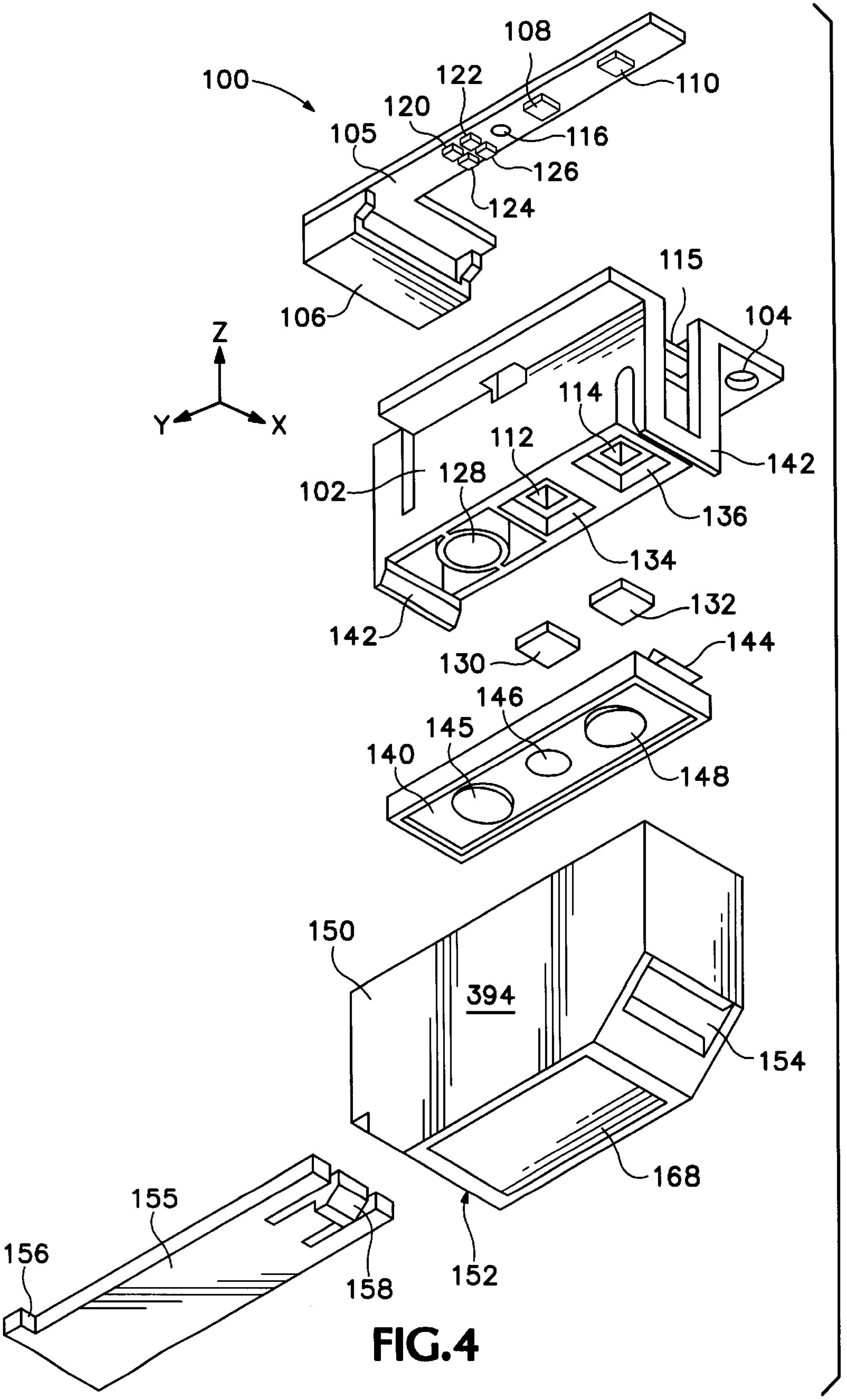
FIG. 4 is an exploded view of the compact optical sensor of FIG. 2.

Also shown in FIG. 1, and in greater detail in FIGS. 2 through 4, is a compact optical sensor system 100, constructed in accordance with the present invention. In FIG. 1, we see the sensor 100 being mounted on an outboard side of the carriage 40. As used herein, the term "inboard" refers to components facing toward the printzone 25, that is, in the positive X-axis direction, whereas the term "outboard" refers to components facing toward the servicing region 42, that is, in the negative X-axis direction. The optical sensor 100 includes a housing or frame 102 shown in FIG. 4 as defining one or more mounting fixtures, such as mounting hole 104 for attaching the sensor 100 to carriage 40. Alternatively, it is apparent that the sensor housing 102 and other external components may be formed as an integral part of carriage 40 in some implementations.

The sensor 100 also includes a printed circuit assembly ("PCA") 105, which was instrumental in creating the illustrated embodiment of the compact sensor system 100. The PCA 105 has a connector receptacle 106 that communicates with controller 45, via, for instance, conventional flexible cables (not shown) which connect the controller 45 with carriage 40 to deliver firing signals to the printheads of the inkjet cartridges 50–55. The PCA 105 includes two light-to-voltage converters, or photodiodes 108, 110 for receiving diffuse and specular reflected light, respectively. Note that the specular portion of the sensor 100 is only needed presently for media type sensing, so if only information about color matching and the inks being laid down by the printer 20 is desired, then the specular photodiode 110 and related specular components may be omitted. Preferably, each of the photodiode light-to-voltage converters 108, 110 are identical in construction to provide ease of manufacturing and a more economical, compact optical sensor 100. The illustrated output voltage is an analog signal which is passed through an amplifier with a specified gain, for instance, a three times gain. This amplified signal is then passed to an analog-to-digital ("A/D") converter which may be a portion of the printed circuit assembly 105, a portion of the electronics onboard carriage 40, or a portion of the controller 45.

The PCA board 105 is constructed such that the specular and diffuse photodiodes 108, 110 receive light through incoming light passages 112, 114 defined by the housing 102. To align the photodiodes 108, 110 with the light passages 1124, 114, the housing 102 includes a support surface 115, which preferably has a lip, shown to the right of photodiode 110 in FIG. 3, under which the PCA board 105 is received. In the illustrated embodiment, the PCA board 105 defines an alignment hole 116 therethrough, which when assembled is received upon an alignment post 118 extending upwardly from the housing support surface 115, as shown in FIG. 3.

The PCA board 105 includes four light emitting diodes (LEDs) 120, 122, 124 and 126 which, in the illustrated embodiment are the colors, blue, green, red and soft-orange, respectively. The construction of the printed circuit assembly 105 advantageously uses a chip-on-board ("COB") process where the bare silicon die for each component is wire bonded directly to the printed circuit board assembly. Thus, in the illustrated embodiment, the LEDs 120–126 may be closely grouped together, in a space smaller than that occupied by a factory-made, single-packaged LED, such as that disclosed in U.S. Pat. No. 6,036,298, as well as that commercially sold in the DeskJet® 990C model color inkjet printer. Note that the LEDs 120–126 and photodiodes 108, 110 have been drawn with some artistic license in FIG. 4 to be about twice their normal size to better illustrate the concepts introduced herein. By clustering the LEDs 120–126 so closely, a single outgoing optical light path 128 defined by the housing 102 may accommodate light generated by all of these LEDs. While the chip-on-board process has been used in other implementations, the inventors believe this to be the first such use of the process in manufacturing an optical sensor, such as sensor 100, for monitoring various processes associated with inkjet printing, including: (1) closed-loop color calibration, (2) automatic printhead alignment, (3) media type sensing, (4) swath height error correction, and (5) linefeed calibration.

The illustrated embodiment includes two optional filter elements, one a diffuse filter element 130, and the other a specular filter element 132, preferably of colors selected to block long, infrared wavelengths, although in some implementations, other filters may be used to either filter or pass through more specific wavelength bands. In the illustrated embodiment, the filter elements 130, 132 are infrared wavelength blocking filters, such as those designed to block infrared wavelengths between 700 and 1000 nm (nanometers). Each of the filter elements 130, 132 are received within a recessed shelf portion 134, 136 defined by the housing 102. The filter elements 130, 132 serve to limit the incoming light to the diffuse and specular photodiodes 108, 110 to light within the regions of the visible spectrum. In the preferred embodiment, an upper portion of the incoming light passages 112, 114 is molded with a square diffuse stop, and a rectangular specular stop, with the longitudinal axis of the specular stop running perpendicular to the longitudinal axis of the housing 102, that is, parallel with the X-axis. Use of such a specular stop was made in the DeskJet® 990C model color inkjet printer. Again, the term "stops" refers to a window through which incoming light passes before it is received by in this case, the specular photodiode 110.

The compact optical sensor 100 also includes a lens assembly 140, which is received by a pair of lower extremities 142 of the housing 102 preferably via a pair of snap fitments, such as the snap fitment 144. In this manner, the filter elements 130, 132 are held in place within recesses 134, 136 by the lens assembly 140. The lens assembly 140 includes an outgoing LED lens 145, and two incoming lenses, here, a diffuse lens 146 and a specular lens 148. The lens elements 145, 146 and 148 are preferably selected to better focus and direct the light beams to follow the paths shown in FIG. 3, and as discussed further below after the remaining components of the optical sensor 100 have been introduced.

Preferably the sensor 100 includes an ambient light shield member 150. The ambient light shield 150 slides over the lens assembly 140 and is attached to the housing 102, for instance using various snap fitments, bonding elements, such as adhesives, fasteners or the like (not shown). The ambient light shield 150 has a pair of opposing slots 152 and 154 which are located to receive and secure a clear aerosol shield member 155. The aerosol shield 155 in the illustrated embodiment is inserted through slot 152 then through slot 154, with the forward insertion being limited by a stop 156 encountering a portion of the body of the ambient light shield 150 (see FIG. 2). A snap fitment member 158 flexes upwardly during insertion of the aerosol shield 155, then latches down over a lower portion of the slot 154 (see FIG. 2) to hold the aerosol shield 155 in place within the ambient light shield 150. Preferably, the aerosol shield 155 has an anti-reflection coating or property which allows light beams to pass therethrough without undue interference from the aerosol shield 155.

The term "aerosol" refers to tiny ink droplets which are emitted by the ink ejecting printhead nozzles in addition to the main droplet which is intended to hit the print media and create an image. These ink aerosol satellites randomly float throughout some models of inkjet printers, and eventually some land on internal components of the printer mechanism. To prevent these floating ink aerosol satellites from landing on the lens assembly 140, and fouling or otherwise permanently altering the incoming light received by the photodiodes 108, 110, the aerosol shield 155 serves to collect a majority of these mischievous aerosol satellites. Use of the snap fitment 158 allows the aerosol shield 155 to be removed from the ambient light shield 150 and cleaned or replaced periodically during the lifetime of the printing mechanism 20. Preferably, the thickness of the aerosol shield 155 is only slightly less than the depth of slots 152 and 154, so the aerosol shield 155 serves to isolate the interior of the ambient light shield 150 from contamination by these ink aerosol satellites.

Now the components of the optical sensor are understood, we will turn to the operation of the compact optical sensor 100, as shown in the cross-sectional view of FIG. 3. In FIG. 3, we see the LEDs 120, 122, 124, and 126 emitting light beams through the outgoing passageway 128, through the outgoing lens 145, and emerging as light beams 160, 162, 164, and 166, respectively exiting through a light entrance/exit chamber portion 168 of the ambient light shield 150. The emerging light beams 160–166 impact an upper exposed print surface of a sheet of print media 169, here, a sheet of plain paper in the illustrated embodiment. Light beams i 60, 162, 164, and 166 are reflected directly off the media 169 as upwardly directed diffuse light beams 170, 172, 174, and 176, respectively. For those who may be unfamiliar with the science of optics, the term "diffuse" refers to light which is scattered (at any angle) when reflected from a surface. The portion of the diffuse light which is used in the illustrated embodiment are the perpendicular beams reflected off of the media 169, as shown for the diffuse light beams. 170–176 in FIG. 3. The incoming diffuse light beams 170–176 pass through lens 146, through filter 130, and through the incoming light chamber 112 and through a rectangular stop or window 178 where they are received by the diffuse photodiode 108. The photodiode 108 is a light-to-voltage converter, as mentioned above, which interprets these incoming diffuse light beams 170–176 and produces a voltage signal proportionate to the intensity of these incoming light beams. This voltage signal is sent via receptical 106 and cable 107, through the carriage 40 to controller 45, where this information is then used by the controller to adjust various printing parameters, as mentioned above.

Besides forming diffuse light beams 170–176, the incoming light beams 160, 162, 164 and 166 reflect off of the media 169 to form incoming specular light beams 180, 182, 184 and 186, respectively. To those familiar with the science of optics, it will be apparent that the specular light beams 180–186 are reflected off of the media 169 at the same angle A as the incoming light beams 160–166 impacted the media 169, in a principle known as "angle of incidence equals angle of reflection." In the illustrated embodiment, preferably the irradiance from each illuminating LED 120–126 strikes the print surface plane of the sheet of media 169 at an angle of about 45–65°, or more preferably at an angle of 45°, referenced from the print surface of the media 169.

The specular reflectance light beams 180–186 pass through the light chamber 168 of the ambient light shield 150, through the aerosol shield 155, through the incoming specular lens 148, through the specular filter element 132, through the incoming light passageway 114, then through a specular stop window 187, after which they are received by the specular photodiode 110. The photodiode 110, which is a light-to-voltage converter, interprets the incoming light beams 180–186 and sends a signal to the controller 45, preferably in the same manner as described previously for signals provided by the diffuse photodiode 108. Additionally, in the embodiment of FIG. 3, the media sheet 169 is shown as being supported in printzone 25 by a media support surface 188, which may take the form of a platen, pivot, or other type of conventional printzone media support system. Besides just print media 169, other components within the printer 20 may be monitored by the optical sensor 100, such as a reference target, discussed further below, or other objects within the print engine, such as black or white target references, or various structures of the media support surface 188, particularly, when a transparent sheet of media is to be printed upon.

By constructing the printed circuit assembly 105 using the chip-on-board process, where the semiconductor dies for the LEDs 120–126 and the photodiodes 108, 110 (light-to-voltage converters) are wire bonded or soldered directly to the printed circuit board, the resulting optical sensor 100 is far more compact than those previously achieved in the inkjet printing arts. For example, the blue-violet optical sensor used in the DeskJet® 990C model color inkjet printer, was nearly three times the height of the illustrated compact optical sensor 100, and this earlier sensor was only capable of carrying a single blue-violet light emitting diode. Furthermore, the addition of the ambient light shield 150 isolates the photodiodes 108, 110 from signal corruption caused by external light sources. Use of the aerosol shield 155 advantageously protects the lens assembly 140 from being occluded by floating ink aerosol satellites generated during the printing process. Moreover, by having the aerosol shield 155 be removable and cleanable, the integrity of the optical sensor 100 is preserved over the lifetime of the printing unit 20.

Furthermore, use of the chip-on-board process to assemble the printed circuit assembly 105 allows the four light emitting diodes 120–126 to use a single common optical path 128 for all four emitters, creating a compact optical sensor 100 in a fashion which, to the best knowledge of the inventors, has never been used in the inkjet printing arts. Additionally, by using four different colors of light emitting diodes 120–126, the single compact optical sensor 100 is capable of media type sensing, color calibration (specifically, color, hue and intensity compensation), automatic pen alignment and swath height error/linefeed calibration, four features which have never before been accomplished using a single sensor element in the inkjet printing arts. Thus, the compact optical sensor 100 is more economical, saves space, and is capable of far more functions than previous optical sensors employed in inkjet printing.

Moreover, use of the ambient light shield 150 and the aerosol shield 155 make the sensor 100 very robust in operation over a wide range of printing environments, providing a low maintenance, long lifetime sensor for achieving optimal high quality printed images. Additionally, use of the chip-on-board technology for forming the printed circuit assembly 105 allows four different colored LEDs 120–126 to be employed in the same width package as that employed for the monochromatic optical sensing system of U.S. Pat. No. 6,036,298, mentioned above.

In the illustrated embodiment, the diffuse reflectance beams 170–176 detect the presence of the primary inks used in inkjet printers, such as, cyan, light cyan, magenta, light magenta, yellow and black. The specular light beams 180–186 are used to determine the reflective and other surface properties of the media 169, from which the type of media being fed into the printzone 25 may be determined, and the print routines then adjusted to match the type of media, for instance in the manner used in the DeskJet® 990C model color inkjet printer. Indeed, use of the four different colored LEDs 120–126 allows the compact optical sensor 100 to collect data which the controller 45 then may map to a three-dimensional color space which correlates to human perception of color. Moreover, while four light emitting diodes 120–126 are illustrated, it is apparent that other implementations may cluster additional LEDs above the outgoing light chamber 128, or another cluster of LEDs may be provided in the region of the specular photodiode 110 on the printed circuit assembly 105, foregoing media type determination in favor of additional color sensing capability.

Another particular advantage made use of in the optical sensor 100 is the arrangement of the colors of the LEDs 120–126. In the illustrated embodiment, it is preferred to have LED 120 to be a blue color, LED 122 to be a green color, LED 124 to be a red color and LED 126 to be a soft-orange color, with LEDs 120 and 124 being furthest away from the diffuse photodiode 108, and LEDs 122 and 126 being closer to the diffuse photodiode 108. In the illustrated embodiment, using the particular types of LEDs 120–126 and lens 145 selected, this physical arrangement yielded the most economical and highest performance sensor 100 for consumers.

Tuning System

Figure 5:
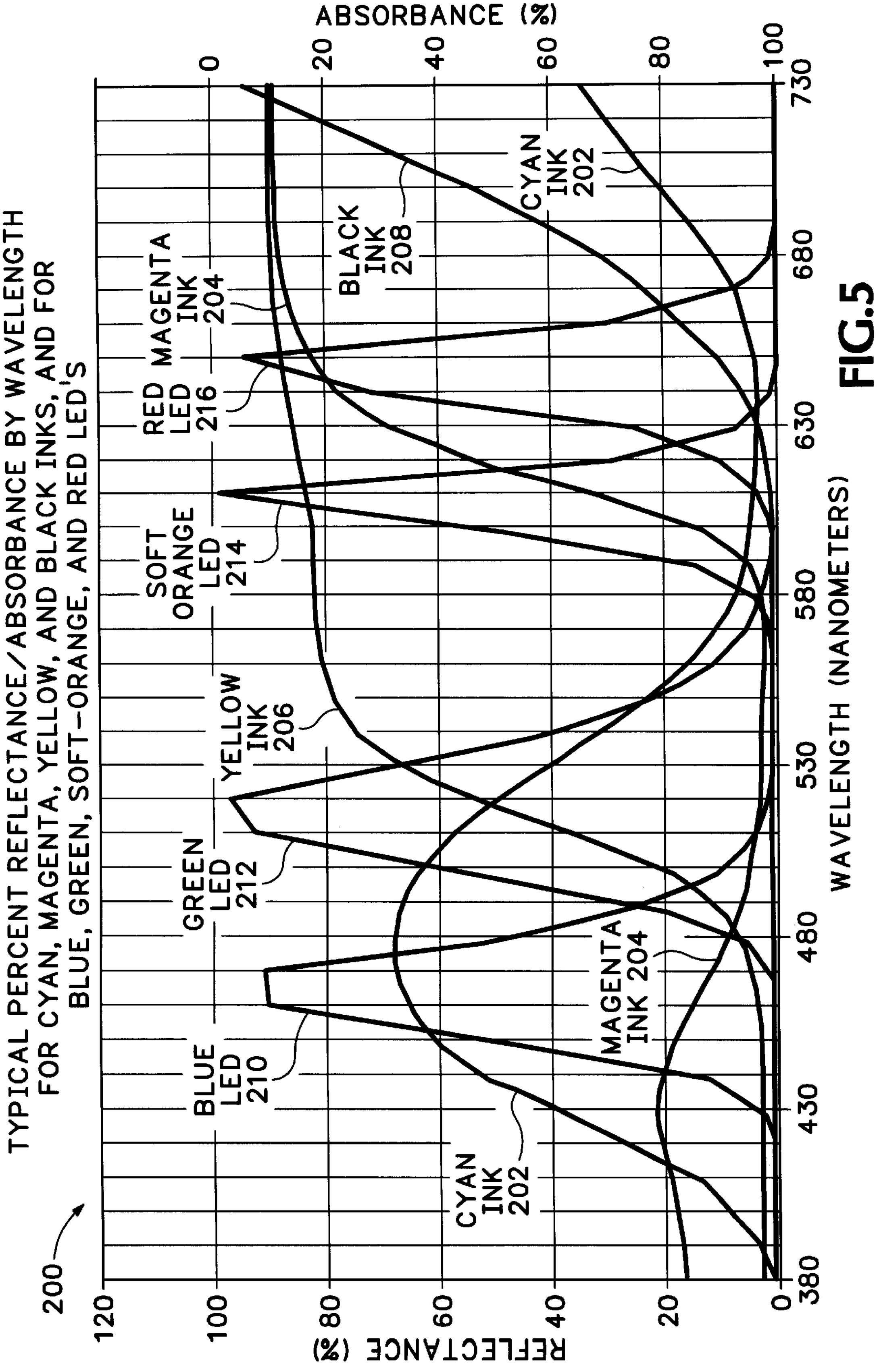
FIG. 5 is a graph showing the relative specular reflectances and specular absorbances versus illumination wave length for cyan, yellow, magenta and black inks, and for blue, green, soft-orange and red illuminating LEDs used by the optical sensor of FIG. 2 when monitoring images printed on white media, such as plain paper.

FIG. 5 shows a graph 200 illustrating the manner in which the colors for the LEDs 120–126 were selected, here based upon the colors of ink and their specular responses used in the printer 20. In FIG. 5, we see the various wavelengths and percentage of reflectance and percentage of absorbance shown for the four primary colors ejected by the printing unit 20 and for the four LEDs 120–126 of sensor 100. For the inks, graph 200 shows a cyan colored ink trace 202, a magenta colored ink trace 204, a yellow colored ink trace 206 and a black color ink trace 208. In the illustrated embodiment, graph 200 shows a blue LED ink trace 210 which is emitted by LED 120, a green LED trace 212 which is emitted by LED 122, a red LED ink trace 216 which is emitted by LED 124, and a soft-orange LED ink trace 214 which is emitted by LED 126.

As used herein, the definitions of a few terms may be helpful:

"Reflectance" is the ratio of the reflected light divided by the incident light, expressed in percent.

"Absorbance" is the converse of reflectance, that is, the amount of light which is not reflected but instead absorbed by the object, expressed in percent as a ratio of the difference of the incident light minus the reflected light divided by the incident light.

"Diffuse reflection" is that portion of the incident light that is scattered off the surface of the media 169 at a more or less equal intensity with respect to the viewing angle, as opposed to the specular reflectance which has the greatest intensity only at the angle of reflectance.

"Specular reflection" is that portion of the incident light that reflects off the media at an angle equal to the angle at which the light struck the media, the angle of incidence.

The four FEDs 120–126 preferably each have a centroid wavelength, which is the center wavelength where half of the total emitted energy is on each side of the wavelength, as shown in the following table:

TABLE 1

CENTROID WAVELENGTH OF THE DIFFERENT LEDs

| ITEM NO. | LED COLOR | CENTROID WAVELENGTH |
|---|---|---|
| 120 | Blue | 469 |
| 122 | Green | 530 |
| 124 | Red | 645 |
| 126 | Soft Orange | 607 |

In Table 1, each of the centroid wavelengths has a tolerance of plus or minus ten nanometers (+/−10 nm) in the illustrated embodiment.

Indeed, one of the primary objectives in designing a commercial embodiment of the compact optical sensor 100 was to use LEDs 120–126 which were commercially available. For example, a better selection for the green LED 122 would have been an LED having a centroid of approximately 530 nm, shifting the green LED trace 212 slightly to the right from the position shown in FIG. 5. Unfortunately, a green LED having a centroid of 530 nm was not commercially available, and the best available compromise was an LED having a centroid of 515–525 nm, or nominally an LED having a centroid of 521 nm, as illustrated in FIG. 5.

In the Introduction section above, a hand held scanning unit made by Color Savvy was described, with an article and a U.S. Patent to Color Savvy being mentioned specifically. This Color Savvy device required eight to sixteen different colored LEDs to illuminate a target area, which if employed in the context of an inkjet printer, may unnecessarily increase the overall cost, and size or footprint of the product.

Rather than requiring a eight to sixteen different colored LEDs, the optical sensor system 100 advantageously made use of two separate realizations. The first realization was that for each output color of a printed image, there is only one particular combination of the four colors of ink, cyan, magenta, yellow and black, which are used to arrive at a particular given color of an image. The second realization was that for proper color balance, tuning and calibration, out of millions of colors which may be obtained using the cyan, magenta, yellow and black inks, only a select group of four hundred colors needed to be analyzed.

Of this four hundred colors, the first one hundred colors consisted of different intensities of each of the basic colors, cyan, magenta, yellow and black. Different inkjet cartridges, installed in the carriage 40 may have slightly different characteristics, resulting in ink droplets having different drop weights being ejected by different pens. Drop weight affects the intensity of the resulting color, with bigger droplets forming darker or more intense colors in the printed image. One way to compensate for these different drop weight variations from pen-to-pen is to eject more ink droplets to darken the shade, or fewer ink droplets to lighten the shade. Thus, by measuring the color intensity produced over a specified range, for instance by printing a pattern where each progressive color sample has an increased number of droplets which should ideally produce increasingly darker shades of a color, the printer controller 45 may reference readings received from the optical sensor 100 and compare them to known values, and in turn then vary the number of droplets printed by a particular pen, or nozzles of the pen to achieve a desired shade, consistency or intensity of the resulting image.

These considerations resulted in the selection of a total of about one hundred different shade or intensity patterns for the color samples where only one color of ink is employed. The remaining about three hundred colors of the selected group of about four hundred for color calibration were based on a grid of varying shades of gray spanning the range from black to white, with some samples tinted with colors, such as pinks, greens and purples, as specified by color imaging designers. Given this group of four hundred different colors to detect, rather than millions of colors, designers of the illustrated sensor 100 then arrived at the four different colored LEDs having traces 210–216 shown in FIG. 5.

Arriving at this selection of four LED colors was accomplished by an intensive study evaluating reflections from the interaction of a variety of different illuminating colors with each of the test colors. These interactions were either found through laboratory measurements, or by graphical or mathematical comparisons of the spectral responses of the inks versus the illumination data provided by the manufacturers of the variety of LEDs available. After this preliminary evaluation, different groups or subsets of LEDs were selected for further more intensive study and reevaluation, first studying subsets of three LEDs, then later by studying subsets of four LEDs. Each subset of LEDs selected was capable together of allowing identification and distinction between each test color of the selected group. During this process, a test patch sample of the test colors was printed and measured with a reference measurement device which generated a set of reference reflection data for the different colors of the patch sample. These actual color measurements may be made using a reference measurement device, such as an expensive laboratory piece of equipment, for instance a spectrophotometer. The patch sample was then illuminated with the LEDs of each subset and a measured set of reflection data was accumulated, then compared with the reference reflection data. The subset of LEDs having the lowest error values were then selected, for instance, based on selected printing product criteria, such as which shades are preferred, a particular printer model, or a particular set of inkjet inks. For example, the criteria may be based on the desired image output, such as whether particular colors, shading or grays are preferred. These colors may also be affected by other selected printing product considerations beyond the ink and printer model selections, such as pre-printing or post-printing treatments of the media, such as an overcoating or laminating process.

When measuring any particular color sample of the select group of 400 different shades, each of the four LEDs 120–126 is illuminated in sequence, with the resulting diffuse light beams 170–176 then being interpreted by the diffuse light-to-voltage converter 108 to find the percentage of reflectance and/or absorbance. By comparing the reflectance values received when illuminated by the different LEDs 120–126, the various shades are distinguished by controller 45. For instance, turning to FIG. 5, the cyan ink curve 202 may be distinguished from the other ink curves because the blue LED generates maximum reflectance, the green LED a medium reflectance, and the soft orange and red LEDs generate minimal reflectances. For the magenta ink curve 204, the blue LED generates a small reflectance, the green LED generates a minimal reflectance, the orange LED generates a medium reflectance, while the red LED generates a high reflectance. Table 2 illustrates the various reflectances for each color ink and each LED.

TABLE 2

REFLECTANCES FOR INKS BY ILLUMINATION COLOR

| INK COLOR | BLUE LED | GREEN LED | ORANGE LED | RED LED |
|---|---|---|---|---|
| Cyan | High | Moderate | Low | Low |
| Magenta | Low | Minimal | Moderate | High |
| Yellow | Low | Moderate | High | High |
| Black | Minimal | Minimal | Minimal | Low |

Of course, the percent reflectance shown in FIG. 5 varies with the amount of ink which is laid down upon a sheet of media, but during such a calibration sequence, the controller 45 generates firing signals which command the light cyan, cyan, black, magenta, light magenta and yellow ink cartridges 50–55 eject a known drop count or number of droplets for each sample measured.

In arriving at the particular colors of LEDs 120–126 which are shown in FIG. 5, a series of simulated and physical experiments were run. In developing the illustrated sensor 100, following the realization that only four hundred colors need to be detected given the particular inks employed and the knowledge of which combinations of these inks produced a desired color, the sensor designers named herein worked to find an optimal group of LEDs which, using the chip-on-board process, were capable of being assembled into the compact optical sensor 100. During the early development stages, a three LED sensor was proposed, having only red, green and blue LEDs.

In this early prototype three LED color set, there were some noticeable errors. For instance, since the viewing audience of the ultimate images produced by printer 20 are humans, selections were based on human perception. One mathematical model for determining variation in color, such as varying shades of pink or gray, is referred to as "Delta E." A Delta E value of one refers to different shades which are barely distinguishable from one another, while a Delta E of two refers to shades which are certainly different. Using only blue, green and red LEDs, errors were found on the order of a Delta E of two, meaning that the shades were noticeably different to most people. This result was not satisfactory to the inventors herein, and the search continued for a way to bring down the Delta E value. This continuing quest resulted in the selection of the soft-orange LED 126 which produces curve 214 in FIG. 5. The addition of the fourth LED, here the soft-orange LED 126, yielded half the error value, dropping the Delta E value from two to a value of one. Thus, by using the four LEDs having the waveforms 210–216 shown in FIG. 5 (although a better green would have a centroid of 530 nm rather than the 521 nm shown for the commercially available green LED curve 212) yielded results which the inventors found acceptable while still allowing the sensor 100 to be an economical unit for incorporation into inkjet printing mechanisms.

Given this knowledge of the illustrated the compact optical sensor 100, as well as how the four LEDs 120–126 were selected, and based on the realization that only four hundred test colors need to be monitored using the specific inks for which the printer 20 is designed, the manner in which this information may be used to provide optimal quality images for human viewers will be illustrated. The resulting image appearing on a sheet of media 169 may vary due to a myriad of different conditions (e.g., environmental conditions, including altitude, temperature and/or humidity), or due to the particular printhead which is ejecting the colors (different pens eject different drop weights in response to a given firing signal, resulting in different color intensities). Other factors may influence the resulting image, including the type of media upon which an image is being printed (plain paper, glossy media, photo media, transparency media, various colors of media such as pink, green, orange, blue, and even brown paper lunch sacks or fabrics). Because of these varying conditions, the resulting printed color often does not match the desired color.

At least two methods may be used to determine how to adjust the commanded color in a print mechanism, such as printer 20, to obtain the desired color. First, by measuring the actual color produced from a composite of colorants (light cyan, cyan, black, magenta, light magenta, yellow) as well as knowing the desired color, it is possible to compensate for the difference between the actual and desired values by modifying the commanded color to make the actual and desired values agree. Second, it is possible to determine the actual amount of a single colorant deposited in a test region, then knowing the desired amount and reading the resulting appearance, the amount deposited for printing the image may be compensated by accounting for this difference to make the resulting image the one which is desired. Specifically, desired composite colors may then be obtained by using an a-priori knowledge of the colors resulting from specific mixtures of colorants (light cyan, cyan, black, magenta, light magenta, yellow). This a-priori knowledge found by printing a test sample, then takes into account not only the ink-to-ink interactions, but also the ink-to-media interactions. For instance, a brown paper sack may have more absorbance of the inks than a piece of plain paper, and a transparency may have less absorbance than plain paper or glossy photo paper. Knowledge of the absorbance of the ink into the media (to be distinguished from reflectance/absorbance shown in FIG. 5) may allow the controller 45 to deposit fewer droplets upon the less absorbent media to yield a clearer, crisper image.

Implementing either of these two methods requires the measurement of a printed color sample, and the comparing of this measurement with known values for producing desired colors. In the illustrated embodiment, the selection of the blue, green, soft-orange and red LEDs provide information about the amounts of each colorant in a composite color sample, for instance a green or purple sample, the controller 45 may then compute the resulting color quite accurately. Once the resulting color, given standard ink ejection parameters, is known these ink ejection parameters may be adjusted to obtain the desired color in the resulting image.

While variations in the ink ejecting printheads of cartridges 50–55 have been mentioned, it is apparent that the LEDs 120–126 may each vary from sensor to sensor so that one particular manufacturing lot of LEDs may be slightly different in emission wavelength from another lot. By calibrating each manufactured sensor 100 on test targets in the factory, using the same ink colorants, a customized curved fit may be made to compensate for such LED variations. Thus, at the factory compensation for LED variations may be made without requiring the use of specially selected and expensive LEDs for use in sensor 100, again, resulting in a more economical compact optical sensor 100 for use in the printing unit 20.

In the past, color sensors employed in the inkjet printing arts have either had to be designed with very accurate, and thus very expensive components, or they have used generic color standards to calibrate less accurate components. However, when building a color sensor capable of accurately determining the perceived color for a patch of arbitrary spectral characteristics, the resulting product was more expensive than tailoring a sensor design to work with a more limited set of color samples. As illustrated herein, the compact optical sensor 100 provides accurate color measurements while using inexpensive components, including LEDs 120–126 and photodiodes 108, 110, by optimizing for a limited specific set of colors, such as the set of four hundred colors mentioned above, and with each sensor 100 being factory calibrated to compensate for component variation found when viewing a standard color set.

Calibrating System

Figure 6:
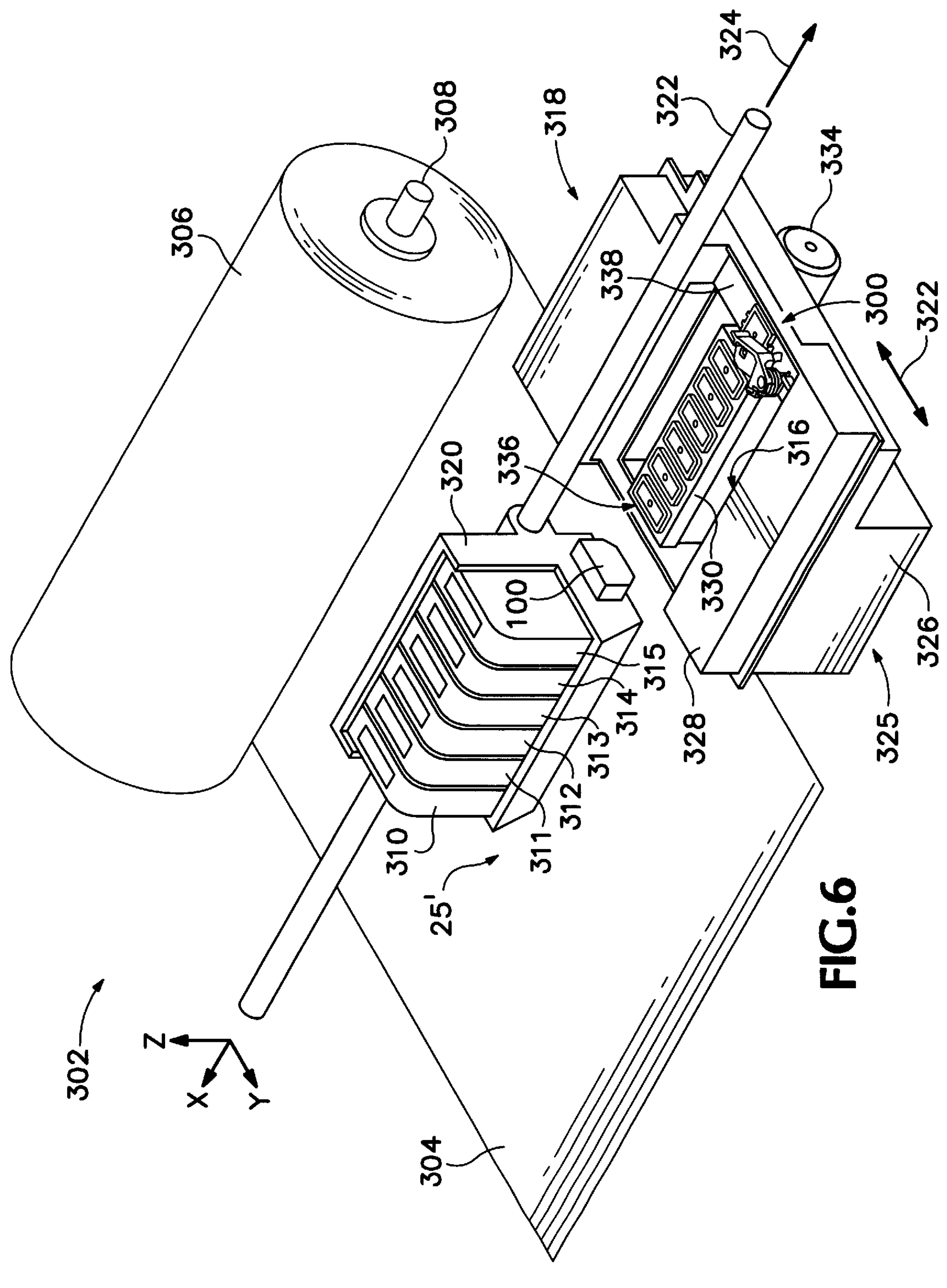
FIG. 6 is a perspective view of an alternate hardcopy device, here showing several components of a printing system which may be used in variety stores, drug stores, the like, to print photographic-quality pictures taken on film or digitally, including one form of a calibrating system for use with a compact optical sensor, such as shown above in FIG. 2.

FIG. 6 shows one form of a calibrating or target system 300, constructed in accordance with the present invention for use with an optical sensor, such as the compact optical sensor 100 when employed in an alternate form of an inkjet printing mechanism, here shown as a photographic printer 302. The photographic printer 302 is shown in a rudimentary format, including several internal working components that reside in a casing or housing (not shown) surrounding these mechanisms. The photo printer 302 may be constructed for use in a home, office or other environment, such as within a supermarket or variety store where one portion of the mechanism develops chemical-based film taken by a conventional camera, or processes digital images taken by a digital camera, and then prints these images on high quality media 304, such as photographic media.

In the illustrated embodiment, the media 304 is fed from a supply roll 306, which is supported by a roller assembly 308, in a fashion similar to that employed in many inkjet plotters, with a conventional cutting mechanism used to separate such photographs being omitted from the view of FIG. 6. The photo printer 302 may be constructed with an off-axis ink supply system as shown in FIG. 1, or with a set of replaceable cartridges 310, 311, 312, 313, 314 and 315, which preferably carry inks of the colors light cyan, cyan, black, magenta, light magenta, and yellow, respectively. The pens 310–315 may purge or spit ink to clear their ink ejecting nozzles into a spittoon 316 when moved over a servicing region 318 by a carriage 320 in which all of the pens 310–315 are nestled. The carriage 320 moves along a guide rod 322 which defines a scanning axis 324, allowing the carriage to move not only into the servicing region 318, but into a printzone 25'. In the printzone 25', the pens 310–315 selectively eject ink to form an image on the media 304, preferably in response to signals received from a controller, such as controller 45 shown in FIG. 1.

FIG. 6 also illustrates a service station 325 as having a base 326, a bonnet 328, and a pallet 330 which holds various printhead servicing components. In the illustrated embodiment, the pallet 330 moves back and forth in forward and rearward directions as indicated by the double headed arrow 332, when driven by a motor 334 linked to a gear assembly (not shown). The pallet 330 may carry various printhead servicing features, such as wipers, primers, or the illustrated cap assembly 336. In the illustrated embodiment, the service station base 326 and/or bonnet 328 may define a mounting shelf 338 upon which the calibrating or target system 300 is supported.

Figure 7:
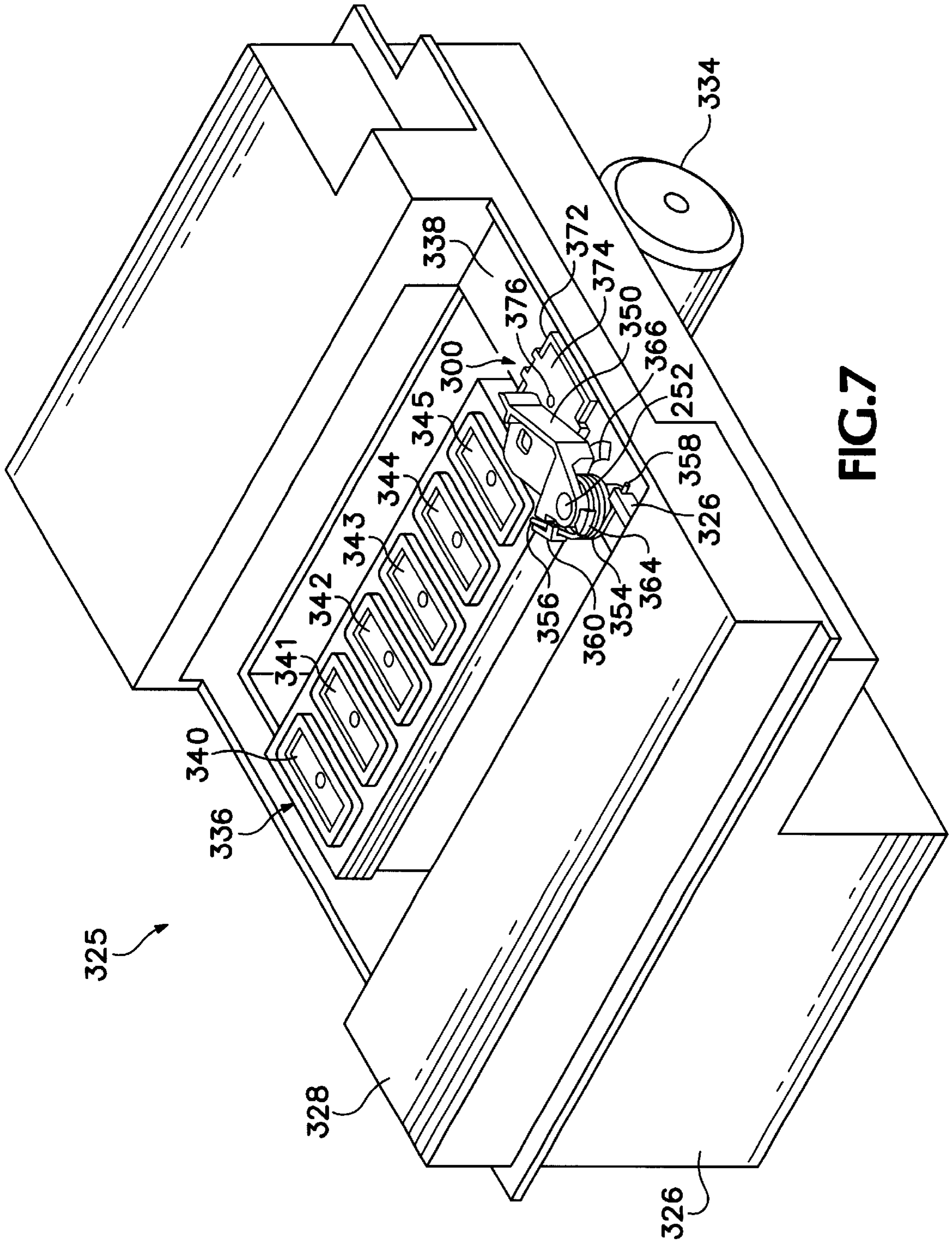
FIG. 7 is a perspective view of one form of a printhead service station, including the calibrating system of FIG. 6.

FIG. 7 shows the service station 325 in greater detail. Here we see the capping assembly 336 as including six printhead caps 340, 341, 342, 343, 344 and 345 which selectively seal the printheads of pens 310, 311, 312, 313, 314 and 315, respectively. Also shown in greater detail in FIG. 7 is the calibrating system 300, which includes a spring biased cover arm or door 350, which is pivotally attached to the support shelf 338 by a pivot post 352 extending upwardly therefrom. A biasing member, such as a torsion or coil spring 354 is used to bias the cover door 350 into a printing position as shown in FIG. 7. The spring 354 has first and second ends 356 and 358, which are secured in place by spring holders 360 and 362, respectively, projecting upwardly from the service station mounting shelf 338. The cover door 350 also has a spring holder portion 364 which assists in keeping the biasing spring 354 in place. To assist in holding the cover door 350 in place, the shelf 338 defines a curved or arced guide track 366 within which a guide foot 368 projecting downwardly from the cover arm 350 is engaged, as shown in FIG. 8.

Figure 8:
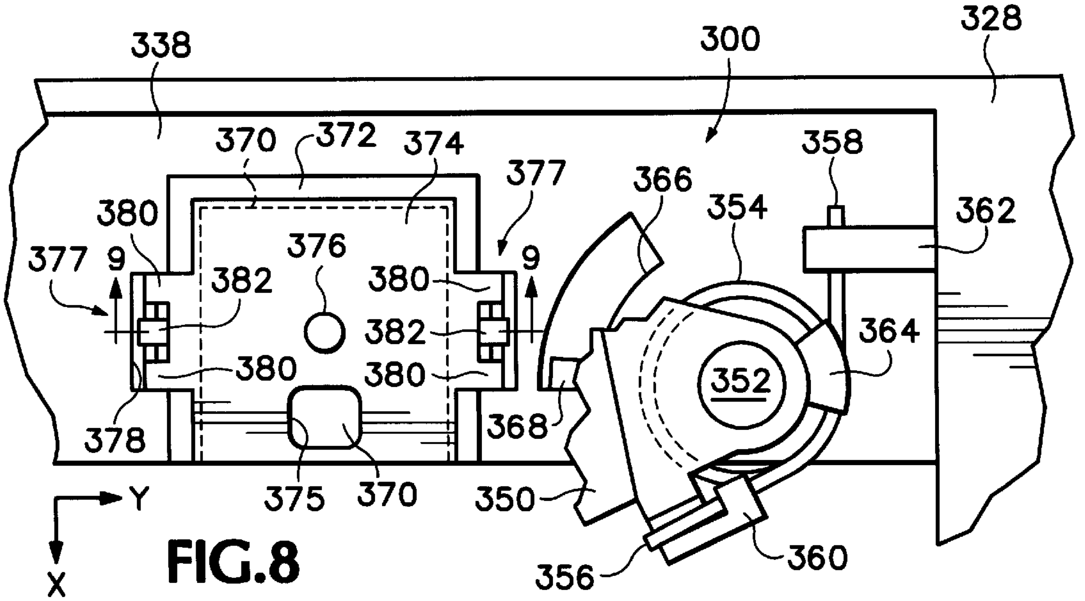
FIG. 8 is an enlarged, partially fragmented, top plan view of the calibrating system of FIG. 6.
Figure 9:
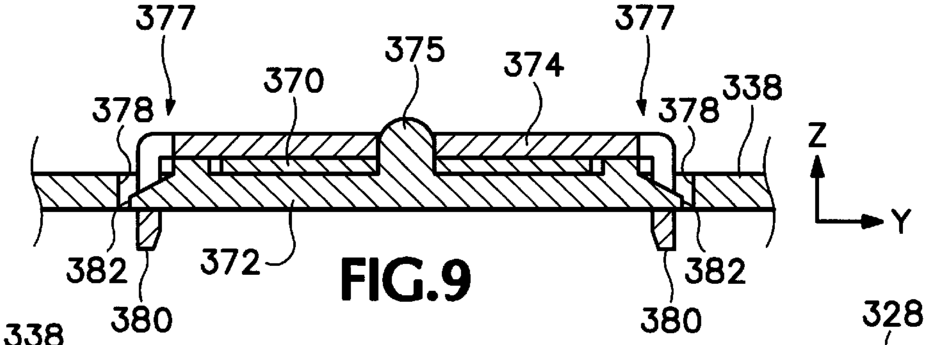
FIG. 9 is a side elevational, sectional view taken along lines 9—9 of FIG. 8.

FIGS. 8 and 9 show a replaceable target member 370 which forms a portion of the target system 300. In the illustrated embodiment, the shelf 338 defines a target base 372 over which the target 370 is laid and then covered by a target cover member 374. The target cover 374 defines a cover window 375 through which a portion of the target 370 is visible. Preferably, the target 370 is formed of a replaceable and duplicatable color of die-cut plastic film, such as one having the color of Hewlett-Packard Company's Bright White® brand inkjet media. A central post 376 projecting upwardly from the base 372 intersects holes defined by both the target 370 and the cover 374 to align the target, cover and base. The target cover and base 374, 372 together define a pair of target attachment assemblies 377, as shown in greater detail in FIG. 9. The target base 372 defines a pair of slots 378 therethrough, which each receive a pair of snap fitment finger members 380, projecting downwardly from the target cover 374. The target base 372 has a pair of ramp features 382 over which the finger members 380 of the target cover 374 slide and snap in place to secure the cover 374 and target 370 to the base 372.

Figure 10:
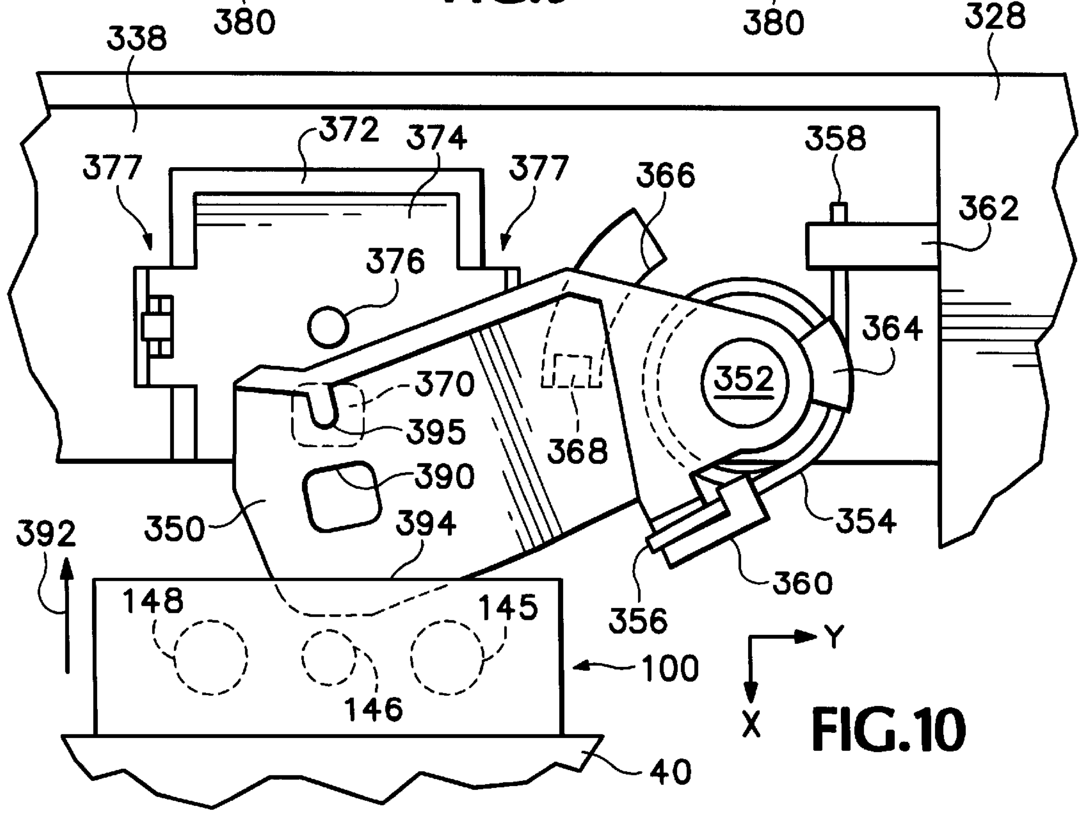
FIG. 10 is a top plan view of the calibrating system of FIG. 6, shown in a printing position.
Figure 11:
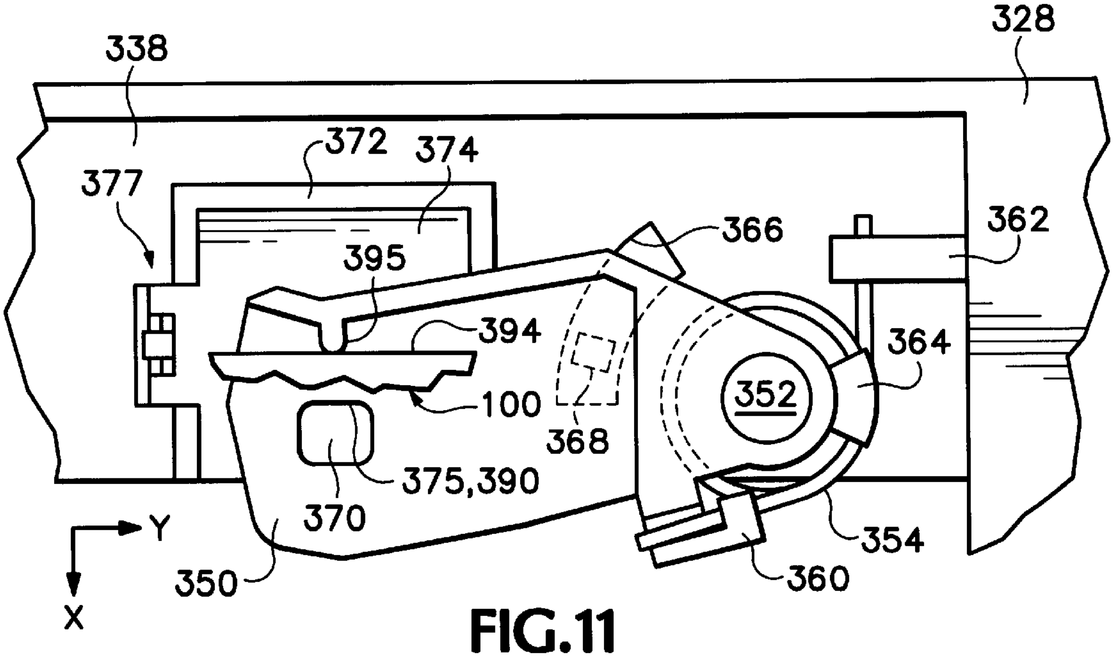
FIG. 11 is a top plan view of the calibrating system of FIG. 6, shown in a calibrating position.
Figure 12:
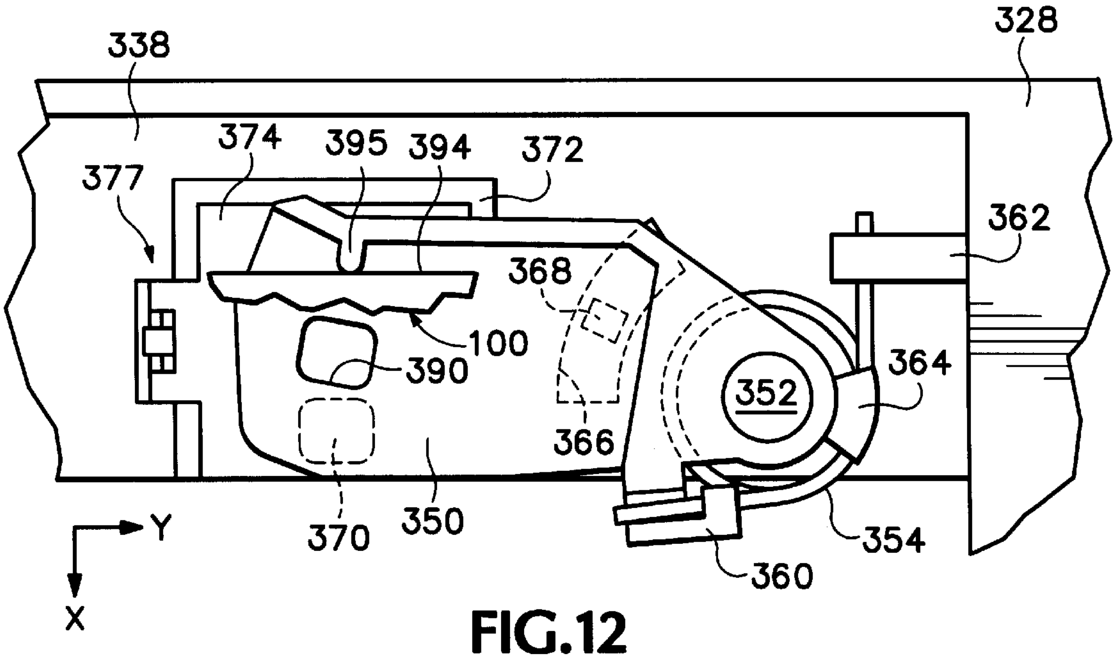
FIG. 12 is a top plan view of the calibrating system of FIG. 6, shown in a storage position during a period of printing inactivity.

FIGS. 10, 11 and 12 show different stages of operation of the cover door 350, with FIG. 10 showing the position of the door 350 for printing, as also shown in FIGS. 6 and 7, FIG. 11 showing a target reading position, and FIG. 12 showing a storage position where the printheads 310–315 are sealed by caps 340–345, respectively. In FIG. 10 we see the cover door 350 as defining a door window 390, which is preferably of approximately the same size as the cover window 375.

In FIG. 10 we see the carriage 40 and sensor 100 entering the servicing region 318, as indicated by arrow 392. As shown in FIG. 11, the sensor 100 includes an outer impact or opening wall 394 which comes in contact with and pushes upon a door opener feature 395 on the cover door 350. FIG. 11 shows the cover door moved from the printing position of FIG. 10 into a target reading position, where the door window 390 and the cover window 375 are aligned to expose the target 370 for viewing by the optical sensor 100. In FIG. 12, the printhead carriage 40 has moved further in the direction of arrow 392 to move the cover door 350 into a storage position, where the target 370 is again covered by door 350, preventing aerosol contamination during storage, as well as during printing as shown in FIGS. 6, 7 and 10.

In operation, the target or calibrating system 300 is used to recalibrate for any defects in sensor 100 before beginning to print a sheet. These defects, are not truly defects, but merely refer to sensor aging or drift, that is, aging of the LEDs 120–126 and the drift in the output value of the photodiodes 108, 110 which is expected over time for such electrical components. Use of the calibrating target 370 may also compensate for aging and contamination build-up on the optical path components, such as those caused by aerosol and dust accumulation. Use of the target 370 allows the printer controller, such as controller 45, to detect and measure these aging results and electronic drift of these components, then to allow the system to perform an internal calibration before printing a sheet.

Use of the cover door 350 advantageously prevents the target 370 from becoming contaminated with inkjet aerosol, dust, debris and other contaminants, by only allowing the target 370 to be viewable during a reading, and otherwise being covered during printing as well as during periods of printer inactivity when the printheads 310–315 are sealed by caps 340–345. Thus, by keeping the target 370 in a pristine, clean state, a reference system is available for the sensor 100, which does not degrade over time. However, in some implementations it may desirable to change out the target surface 370, which is easily accomplished by unsnapping the target cover 374 from the target base 372 and either rotating the target 370 so a fresh quadrant of the target is available, or replacing the dirty target 370 with a fresh one. The cover door 350 then acts as a shutter for the white calibrating reference target 370, so that the target is only exposed for small periods of time during which optical sensor readings are taken. Indeed, covering of the target 370 with door 350 is necessary due to the amounts of ink aerosol generated during purging or spitting of the printheads into the spittoon 316, which is accessible to the pens 310–315 when the pallet 330 is moved into a retracted position by motor 334. By having the cover door 350 only briefly open when the sensor 100 is in alignment with target 370, the exposure of the target 370 to ink aerosol, dust particles, paper fibers and other contaminants is minimal.

While other products like scanners and hand held colorimeters have used white reference targets, they were not concerned with exposure to ink aerosol contaminants, as encountered in the inkjet printing environment, and thus had no need for a protective door 350. Use of the cover door 350 and target 370 enables the sensor 100 to provide a high-precision calibration process which occurs robustly over time in the relatively dirty environmental of an inkjet printer. Furthermore, use of the spring biased cover door 350 is simple and economical to implement, although motor or solenoid actuated shutter systems may also be useful in higher end, more expensive products if desired.

What is claimed is:

1. A method of monitoring a parameter in a hardcopy device, comprising:

illuminating an object within the hardcopy device with four light emitting elements each of a different color;

receiving light from said four light emitting elements after being reflected from the illuminated object; and interpreting information concerning said parameter from said received reflected light.

2. A method according to claim 1 wherein:

said illuminating comprises sequentially emitting said four different colors of light; and said receiving comprises sequentially receiving said light reflected from the illuminated object by said four light emitting elements.

3. A method according to claim 1 wherein said four different colors of light comprise blue, green, red and orange.

4. A method according to claim 3 wherein:

a first of the four light emitting elements emits a blue light having a wavelength with a centroid of 454–484 nanometers;

a second of the four light emitting elements emits a green light having a wavelength with a centroid of 515–545 nanometers;

the third of the four light emitting elements emits a red light having a wavelength with a centroid of 630–660 nanometers; and the fourth of the four light emitting elements emits an orange light having a wavelength with a centroid of 592–622 nanometers.

5. A method according to claim 4 wherein:

the first of the three light emitting elements emits a blue light having a wavelength with a centroid of 459–479 nanometers;

the third of the three light emitting elements emits a red light having a wavelength with a centroid of 635–655 nanometers; and the fourth of the three light emitting elements emits an orange light having a wavelength with a centroid of 592–622 nanometers.

6. A method according to claim 5 wherein the second of the three light emitting elements emits a green light having a wavelength with a centroid of 520–540 nanometers.

7. A method according to claim 5 wherein the second of the three light emitting elements emits a green light having a wavelength with a centroid of 511–531 nanometers.

8. A method according to claim 1 wherein:

said receiving comprises receiving said reflected light with a sensor; and the method further includes supporting each of the four light emitting elements and the sensor on a circuit board.

9. A method according to claim 8 wherein:

said receiving comprises receiving diffuse reflected light with said sensor, and receiving specular reflected light with a second sensor; and said supporting further comprises supporting said sensor and said second sensor on said circuit board.

10. A method according to claim 1 further including shielding ambient light from interfering with said illuminating and said receiving.

11. A method according to claim 1 wherein:

said receiving comprises receiving said reflected light with a sensor; and the method further includes shielding said four light emitting elements and said sensor from contaminants with a contaminant shield.

12. A method according to claim 11 wherein following said shielding, the method further includes:

removing the contaminant shield from a structure associated with said plural light emitting elements and said sensor;

thereafter, cleaning the contaminant shield; and thereafter, reinstalling the contaminant shield in said structure for another period of said shielding.

13. A method according to claim 1 wherein the four light emitting elements each comprises a light emitting diode.

14. A method according to claim 1 wherein the hardcopy device comprises an inkjet printing mechanism having a carriage which reciprocates across a printzone, wherein the four light emitting elements and a sensor for said receiving of said reflected light are supported by the carriage, and the method further includes transporting said light emitting elements and said sensor through said printzone.

15. A method of selecting a subset of illuminating colors for an optical monitor in an inkjet printing mechanism which prints using plural colorants, comprising:

selecting a group of test colors;

determining which blend of said colorants forms each of the test colors;

evaluating reflections from interaction of a variety of different illuminating colors with each of the test colors;

determining plural subsets of said illuminating colors, with each subset allowing identification and distinction between each test color of said group; and thereafter based on preselected criteria, selecting one subset of illuminating colors from said plural subsets for said optical monitor.

16. A method according to claim 15 wherein:

the plural colorants comprise the colors of cyan, magenta, yellow and black; and said selecting comprises selecting said subset of test colors comprising:

(a) a first subgroup of plural different shades of cyan;

(b) a second subgroup of plural different shades of magenta;

(c) a third subgroup of plural different shades of yellow; and (d) a fourth subgroup of plural different shades of black.

17. A method according to claim 16 wherein said selecting comprises selecting said subset of test colors comprising:

(a) a fifth subgroup of plural different shades of light cyan; and (b) a sixth subgroup of plural different shades of light magenta.

18. A method according to claim 16 wherein said plural different shades for the first, second, third and fourth subgroups each comprise ten to twenty different shades.

19. A method according to claim 15 wherein:

the plural colorants comprise the colors of cyan, magenta, yellow and black; and said selecting comprises selecting said subset including 300–500 test colors.

20. A method according to claim 19 wherein said selecting comprises selecting blue, green, red and orange as said one subset of illuminating colors.

21. A method according to claim 19 wherein said selecting further comprises selecting orange as one of said illuminating colors.

22. A method according to claim 21 wherein the orange illuminating color has a wavelength with a centroid of 592–622 nanometers.

23. A method according to claim 22 wherein the orange illuminating color has a wavelength with a centroid of 597–617 nanometers.

24. A method according to claim 15 wherein said selecting comprises selecting blue, green and red as said one subset of illuminating colors.

25. A method according to claim 24 wherein:

the blue illuminating color has a wavelength with a centroid of 454–484 nanometers;

the green illuminating color has a wavelength with a centroid of 515–545 nanometers; and the red illuminating color has a wavelength with a centroid of 630–660 nanometers.

26. A method according to claim 25 wherein:

the blue illuminating color has a wavelength with a centroid of 459–479 nanometers; and the red illuminating color has a wavelength with a centroid of 635–655 nanometers.

27. A method according to claim 26 wherein the green illuminating color has a wavelength with a centroid of 520–540 nanometers.

28. A method according to claim 26 wherein the green illuminating color has a wavelength with a centroid of 511–531 nanometers.

29. A method according to claim 15 wherein said selecting comprises selecting illuminating colors emitted by light emitting diodes.

30. A method according to claim 15 wherein said selecting comprises selecting illuminating colors emitted by light emitting diodes which are directly mounted to a circuit board along with a sensor which, during said sensing, receives said light reflected from each of the illuminated test colors.

31. A method according to claim 15 further including illuminating with at least some of said variety of different illuminating colors said group of test colors and measuring said reflections therefrom before said evaluating.

32. A method according to claim 15 wherein said evaluating comprises mathematically comparing at least some expected reflections from said interaction of said variety of different illuminating colors with each of the test colors.

33. A method according to claim 15 wherein said plural subsets of said determining each comprises at least three of said illuminating colors.

34. A method according to claim 33 wherein said plural subsets of said determining each comprises four of said illuminating colors.

35. A method according to claim 33 wherein said plural subsets of said determining each comprises three or four of said illuminating colors.

36. A method according to claim 15 further including reevaluating said illuminating colors of said plural subsets by illuminating said group of test colors therewith and measuring said reflections therefrom.

37. A method according to claim 15 further including:

printing a test patch sample of said group of test colors;

reevaluating said illuminating colors of said plural subsets by illuminating said test patch sample therewith and measuring said reflections therefrom;

measuring said test patch sample with a reference measurement device and generating therefrom reference reflections; and wherein said selecting comprises comparing said measured reflections with said generated reference reflections.

38. A method according to claim 37 wherein said selecting comprises:

comparing said measured reflections with said generated reference reflections and determining error values therebetween for each of said plural subsets; and selecting said one subset of illuminating colors having a lowest number of said error values.

39. A method according to claim 37 wherein said reference measurement device comprises a spectrophotometer.

40. A method according to claim 15 further including:

printing a test patch sample of said group of test colors with a selected printing product; and wherein said preselected criteria are based on a desired image output of said selected printing product.

41. A method according to claim 40 wherein said selected printing product comprises a set of inkjet inks each comprising one of said plural colorants.

42. A method according to claim 40 wherein said selected printing product comprises a selected model of said inkjet printing mechanism.

* * * * *